Feb. 14, 1928.
O. R. SCHUMANN
1,659,334
INSULATING PROTECTOR FOR MULTIPLE CONDUITS ON ELECTRIC VEHICLES
Filed July 20, 1925
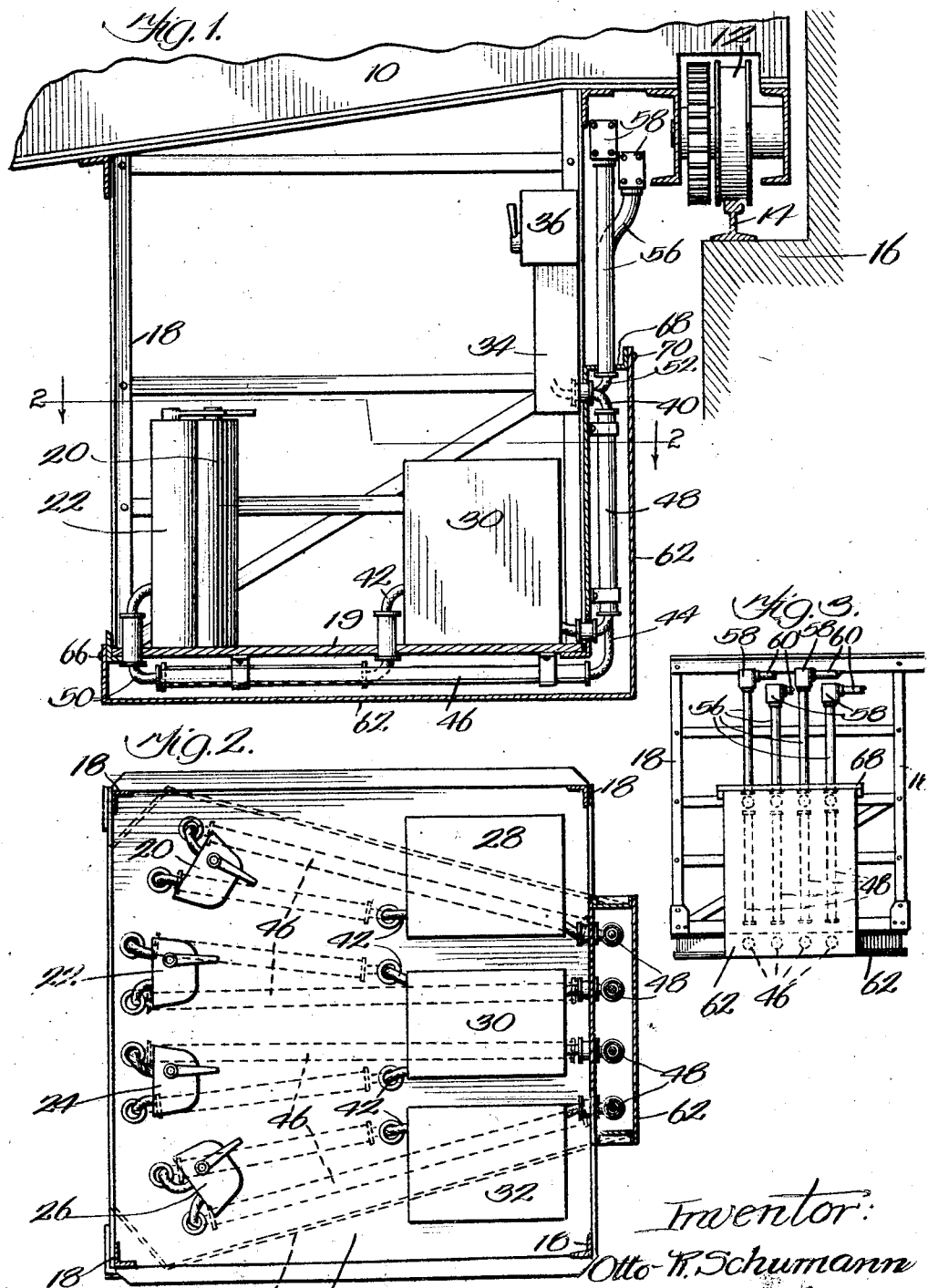
Inventor:
Otto R. Schumann
By Cheever & Cox
Attys.

Patented Feb. 14, 1928.

1,659,334

UNITED STATES PATENT OFFICE.

OTTO R. SCHUMANN, OF CHICAGO, ILLINOIS, ASSIGNOR TO WHITING CORPORATION, OF HARVEY, ILLINOIS, A CORPORATION OF ILLINOIS.

INSULATING PROTECTOR FOR MULTIPLE CONDUITS ON ELECTRIC VEHICLES.

Application filed July 20, 1925. Serial No. 44,854.

This invention relates to means for insulating and protecting multiple wiring conduits on any sort of an electric vehicle but it is particularly designed and adapted for use in connection with the controlling cage on electric cranes and will accordingly be so described.

The object of the invention is to provide a device of this kind which does away with the use of elaborate junction boxes, applicable with difficulty in the constructions under consideration, thereby decreasing the cost of construction in case of electric cranes about $150 per equipment and, at the same time, providing more adequate accrued protection.

The invention consists in mechanism capable of attaining the foregoing and other objects; which can be easily and cheaply made; which is satisfactory in use and is not readily liable to get out of order.

More particularly, the invention consists in numerous features and details of construction which will be hereafter more fully set forth in the specification and claim.

Referring to the drawings in which like numerals represent the same parts throughout the several views:

Figure 1 is a side elevation, certain parts being shown in section, of the electric crane cage equipped with the device of this invention.

Figure 2 is a sectional, plan view on approximately the line 2—2 of Figure 1.

Figure 3 is a reduced size end view taken from the left side of Figure 2.

Figure 1 shows fragmentarily the main girder 10 of an electric traveling crane, carried at its opposite ends on wheel 12 on tracks 14 supported on the wall 16 of the building or the like in connection with which it is installed. Rigidly secured to and depending from the crane girder or girders 10 is a more or less conventional, rectangular cage frame 18 having a floor 19 on which an operator within the cage stands in driving and controlling the crane. Inside this cage are located conventionally a multiplicity of controllers 20—22—24—26, a multiplicity of resistance boxes 28—30—32, one or more fuse boxes 34 and safety switches 36.

In order to secure proper operation of the crane, it is necessary that the fuse box or boxes be connected to the resistance boxes by independent, vertical cables 40 and that each controller be connected to a resistance box by an independent cable 42 and that each controller be connected with a fuse box and safety switch through an independent cable 44. Each of the latter cables turns the lower right hand corner of the cage intermediate between the horizontal supporting insulating pipe 46 and the vertical, supporting, insulating pipe 48 which connects it to the bottom and right hand side, respectively, of the cage body. Under prior constructions, the small, right angle junction box would be required at this turn 44 in the cable just mentioned and similar junction boxes would be required at all right angle turns in any of the cables which are outside of the frame of the cage,—such, for instance, as at turns 50 shown at the lower left hand corner of the cage in Figure 1, all turns of cables 40, heretofore referred to, and the turns 52 of the cables leading from the fuse box 34 into upright insulating pipes 56 and thence through junction box 58 to the wires or cables 60, delivering to the operating mechanisms, not shown, of the crane.

In this invention, the expense of the various junction boxes referred to and the difficulty in getting the cables through them in the small space which is provided adjacent to the cage shown is accomplished by entirely omitting such junction boxes and enclosing all of the cables referred to in the protecting angular covering member 62, detachably secured to the lower left hand edge of the cage by any suitable means as, for instance, rivets 66, and to the right hand side of the crane, as shown in Figure 1, by means of the angle iron 68 and connecting bolts or rivets 70. This covering member 62 is spaced from the bottom and side of the cage a sufficient distance to clear all of the cable parts and thus prevent the more or less delicate belt cable corners from contacting with any outside object which the crane may approach. The case 62 also acts as a base or rest sustaining the cage clear of the floor in the operation of erecting, thereby protecting the wires 46 from injury by the floor during this operation. When it is desired to get at the wiring referred to, the bolts or rivets 66 and 70 are removed thereby permitting the removal of the covering member 62 and consequently all obstruction between the operator and the various cables below and at the right hand side of the cage, as shown in Figure 1. As heretofore noted, upwards of $150 is saved by the use of the construction described on any given crane—this without sacrificing any results heretofore obtained and providing insulation and protection for the various cables shown and described.

Having thus described my invention, what I claim as new and desire to secure by Letters Patent is:

In a traveling crane in combination with the operator's cage and electric wiring outside the cage making unprotected turns, a detachable angular covering member fitted over a corner of the cage enclosing but clearing said wire turns, and means securing the cover member in place, said cover member being also adapted to act as a support or rest sustaining the cage above the floor during erecting or the like.

In witness whereof, I have hereunto subscribed my name.

OTTO R. SCHUMANN.